(12) United States Patent
Kaluza et al.

(10) Patent No.: US 11,767,018 B2
(45) Date of Patent: Sep. 26, 2023

(54) PREPARING A MOTOR VEHICLE FOR AN OPERATION

(71) Applicant: Bayerische Motoren Werke Aktiengesellschaft, Munich (DE)

(72) Inventors: Sebastian Kaluza, Munich (DE); Enrique Marcial-Simon, Veitshoechheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 351 days.

(21) Appl. No.: 17/291,317

(22) PCT Filed: Nov. 25, 2019

(86) PCT No.: PCT/EP2019/082462
§ 371 (c)(1),
(2) Date: May 5, 2021

(87) PCT Pub. No.: WO2020/109249
PCT Pub. Date: Jun. 4, 2020

(65) Prior Publication Data
US 2022/0001868 A1 Jan. 6, 2022

(30) Foreign Application Priority Data
Nov. 26, 2018 (DE) ..................... 10 2018 129 704.1

(51) Int. Cl.
*B60W 30/192* (2012.01)
*B60W 50/00* (2006.01)
(Continued)

(52) U.S. Cl.
CPC ......... *B60W 30/192* (2013.01); *B60R 16/023* (2013.01); *B60R 16/037* (2013.01);
(Continued)

(58) Field of Classification Search
CPC .......... B60W 30/192; B60W 50/0097; B60W 2556/10; B60W 2050/0082;
(Continued)

(56) References Cited

U.S. PATENT DOCUMENTS

| 2002/0092690 A1 | 7/2002 | Benz et al. |
| 2015/0041113 A1 | 2/2015 | Enke et al. |

(Continued)

FOREIGN PATENT DOCUMENTS

| DE | 100 59 416 A1 | 6/2002 |
| DE | 10 2011 106 357 A1 | 8/2012 |

(Continued)

OTHER PUBLICATIONS

International Search Report (PCT/ISA/210) issued in PCT Application No. PCT/EP2019/082462 dated Feb. 28, 2020 with English translation (five (5) pages).
(Continued)

*Primary Examiner* — Robert L Deberadinis
(74) *Attorney, Agent, or Firm* — Crowell & Moring LLP

(57) ABSTRACT

A method for controlling a preparation function for an operation of a motor vehicle includes determining an expected time of use of the motor vehicle based on a previous journey of the motor vehicle. The motor vehicle includes a time switch configured to control the preparation function. The method also includes outputting the specified time of use and detecting a confirmation of the time of use. The method also includes setting the time switch to prepare the motor vehicle at the confirmed time of use.

15 Claims, 2 Drawing Sheets

(51) Int. Cl.
*B60R 16/023* (2006.01)
*B60R 16/037* (2006.01)

(52) U.S. Cl.
CPC . *B60W 50/0097* (2013.01); *B60W 2050/0082* (2013.01); *B60W 2400/00* (2013.01); *B60W 2556/10* (2020.02)

(58) Field of Classification Search
CPC . B60W 2400/00; B60W 50/00; B60R 16/023; B60R 16/037
See application file for complete search history.

(56) References Cited

U.S. PATENT DOCUMENTS

| | | |
|---|---|---|
| 2017/0008375 A1 | 1/2017 | Blatchley et al. |
| 2017/0210390 A1 | 7/2017 | Porras et al. |

FOREIGN PATENT DOCUMENTS

| | | |
|---|---|---|
| DE | 10 2012 217 615 A1 | 5/2014 |
| DE | 10 2013 215 473 A1 | 2/2015 |
| DE | 10 2016 111 791 A1 | 1/2017 |
| DE | 10 2017 101 212 A1 | 7/2017 |
| DE | 10 2018 000 429 A1 | 7/2018 |
| WO | WO 2010/003711 A1 | 1/2010 |

OTHER PUBLICATIONS

German-language Written Opinion (PCT/ISA/237) issued in PCT Application No. PCT/EP2019/082462 dated Feb. 28, 2020 (six (6) pages).
German-language Search Report issued in German Application No. 10 2018 129 704.1 dated Sep. 10, 2019 with partial English translation (13 pages).
German-language Office Action issued in German Application No. 10 2018 129 704.1 dated Oct. 15, 2019 (six (6) pages).

PREPARING A MOTOR VEHICLE FOR AN OPERATION

BACKGROUND AND SUMMARY OF THE INVENTION

This disclosure concerns the preparation of a motor vehicle for its operation. In particular, this disclosure concerns the time-controlled preparation of the motor vehicle for its operation.

A motor vehicle can be prepared for its operation, for example, by preheating an interior by means of a pre-heater. The pre-heater can burn fuel, which can also be used to operate an internal combustion engine to drive the motor vehicle. In order to control the preparation, a time switch may be provided which a user of the motor vehicle can manually set to a predetermined time at which he wants to prepare the motor vehicle. The time switch can also offer the option to control the preparation daily at the same time. The preparation can also be controlled at the same time on selectable weekdays of a week.

Controls for preparing a motor vehicle for operation have proved to be inflexible. Through the use of modern techniques, an upcoming time of use is predetermined with good accuracy, but the adjustment of the automatically determined time of use is often difficult to reconcile with a manual setting of a user of the motor vehicle.

An object underlying this disclosure is to specify a technique by which the preparation of a motor vehicle for an improved operation can be controlled. This disclosure achieves this and other objects by means of the subject matter of the claims.

A motor vehicle comprises a time switch for a preparation function in order to prepare the motor vehicle for operation at a predetermined time of use.

According to a first aspect, this disclosure is directed to a method for controlling the preparation function includes steps of determining an expected time of use of the motor vehicle on the basis of a previous journey of the motor vehicle; outputting the determined time of use and detecting a confirmation of the time of use; and setting the time switch to prepare the motor vehicle for the confirmed time of use.

The determination of the expected time of use can be carried out in particular by means of machine learning methods. It is possible to search for a pattern within available data on the basis of which the expected time of use can be determined. The determination of the pattern and the determination of the time of use can run automatically.

In different embodiments the method, in particular the determination of the time of use, can be carried out by a control device which is installed in the motor vehicle, by a personal device (smartphone) of a user associated with the motor vehicle, or by an external site which is in at least temporary communicative connection with the motor vehicle. The connection can be made by means of a network and/or the Internet. In particular, the external site can be realized as a server or service, optionally in a cloud. The external site may be set up to evaluate information relating to a plurality of motor vehicles and/or a plurality of users assigned to the motor vehicles. The output of the proposal and the detection of the confirmation can be carried out in the motor vehicle and can be carried out, for example, by means of an interaction device which is set up for this purpose. Alternatively, the output and detection can also be carried out by means of a personal device (smartphone) of a user associated with the motor vehicle, which is in at least temporary communication connection with the motor vehicle and/or with the external site.

The time of use can be determined on the basis of context-based data. The context of the determination may be determined in particular by a driving state of the motor vehicle, a place, a time, an input applied by a user, a calendar entry associated with the user or the motor vehicle, the current weather, a season, the presence of a predetermined additional passenger or other information. The context-sensitive information can be captured by the site which determines the time of use or loaded from another site.

The confirmed time of use can be evaluated by means of machine learning in order to improve a future determination of a time of use. Thus, in particular, a pattern on the basis of which the confirmed time of use was determined may be used more frequently in a subsequent determination. Another pattern by means of which a different time of use was determined which has not been confirmed by a user, may in contrast be less considered for a future determination. Alternatively, the weighting of this pattern may remain unchanged.

The machine learning can be implemented, in particular, by means of methods of artificial intelligence. For this purpose, a neural network can be trained to determine the best possible upcoming times of use. In particular, the performance of the neural network may be high where the neural network is trained by the external site and on the basis of information from a plurality of motor vehicles and/or a plurality of users assigned to motor vehicles.

It is particularly preferred that multiple proposals for expected times of use are determined. Different procedures can also be used to determine a time of use. It is also preferable that a probability of acceptance should be determined for each proposal.

Only a predetermined number N of proposals can be output. If more than N proposals are identified, the proposals may be, for example, arranged chronologically with regard to their times of use, wherein only the N proposals are output, the times of use of which are in the near future.

In another variant, only such proposals can be output, the associated probabilities of which exceed a predetermined threshold. The probability preferably indicates the extent of the statistically reasonable expectation that the specific time of use will be confirmed by the user. The threshold can be fixed or selectable by a user. A possible threshold may be about 60% or higher. Of course, the user can also confirm multiple proposed times of use. In a further embodiment, only the N proposals with the highest determined probabilities can be output. It is also preferable that multiple criteria should be applied in order to select those to be output from a number of determined proposals. The criteria may be weighted.

If the time switch has the ability to manage multiple times of use, then all times of use stored in the time switch or all that are stored in the time switch but not enabled can be deleted. A corresponding function may require confirmation or triggering by a user. This allows memory spaces intended to accommodate times of use to be freed up. A user can thus confirm one or more of the proposals, wherein as far as possible all confirmed times of use can be stored in the time switch.

The time of use may be determined after an imminent transfer of the motor vehicle from a driving state to a parked state has been determined. Normally, the time of use on board the motor vehicle can or must be confirmed in order to enable the preparation function. Determining the time of use can be complex and may require a certain amount of time, which can be in the second or minute range. At the same time, the determination of the time of use may take into account information that is only available towards the end of a journey followed by a parking phase and then further use of the motor vehicle. It can therefore be advantageous to carry out the determination as late as possible during a journey of the motor vehicle. The more precisely it is known when the motor vehicle will be placed in the parked state, the later the time of use can be started without risking that the result of the determination will not be completed in good time before the motor vehicle is switched off or before the user leaves the motor vehicle. Determining the transfer of the motor vehicle from the driving state to the parked state can also be done by means of pattern recognition and/or machine learning methods. If different methods are used to determine times of use which have different durations, the methods can be started in stages so as to each start as late as possible and still be ready at the right time as far as possible.

If the determination of one or more times of use is not completed in good time before the user leaves the vehicle, the output and selection may be carried out by means of the mobile device of the user. Alternatively, a time of use which is not determined in good time may also be dropped. This may be particularly advantageous if one or more other times of use have been determined in good time so that these can be offered to the user for confirmation.

The output can only take place after it has been determined that the motor vehicle is in a state other than a parked state. A driving state is usually indicated by closed doors, seat belts of all occupants being worn, a drive motor started and/or outdoor lighting of the motor vehicle switched on. The parked state usually requires a stationary vehicle, often outside a traffic area. In addition, no person may be present in the parked motor vehicle and/or doors and/or windows may be closed and/or locked. A transfer of the motor vehicle between the driving state and the parked state may be carried out in one or both directions via an intermediate state, which is also called an occupied state. There is usually at least one person on board the motor vehicle in the occupied state, but he does not perform or directly perceive a driving function of the motor vehicle. The exact definition of a driving state, a parked state or an occupied state can be adjusted.

It is also preferable that the specified time of use is output on board the motor vehicle only if a user is on board the motor vehicle. This is the case with the usual definition in the driving state and not in the parked state. A user can be present in the occupied state. For example, the presence of a user can be based on a seat occupancy sensor, a belt lock, or an interior monitoring system. If there is no user on board the motor vehicle, the output may also be made by means of a mobile device assigned to the user.

In general, the time switch is loaded or set to a time which is at a predetermined period before the specified time of use, so that the preparation function can use the time to prepare the motor vehicle. For the sake of simplicity, however, it is also said that the time switch is set to the time of use.

The time switch can be activated so that the preparation function is started or deactivated when the set time occurs. In addition, the time may recur at predetermined intervals, such as after one day. Each recurrence can be activated or deactivated individually. For example, a recurring time of use can be controlled at the same time on all working days of a week.

It is further preferred that multiple time switches are provided. In one embodiment, a first and at least one second time switch are provided, wherein the second time switches can be set to recurring times of use, and the first time switch takes precedence over the second time switches by preventing the control of the preparation function by the second time switches when the first time switch is active.

The preparation function can be maintained for a further predetermined period after the objective of the preparation function has been achieved. For example, air conditioning may be set at a time of use, wherein an air conditioning target, in particular a predetermined temperature in the interior of the motor vehicle, can be maintained for 15 minutes after the time of use, for example. Thus, a certain fuzziness relative to when a user perceives the time of use can be allowed.

A proposal for a time of use can be determined on the basis of a time loaded into the time switch. For example, the time of use can be determined, if it is less than a predetermined period away from a time loaded into the time switch. The time of a one-time or recurring, activated, or deactivated time of use can be considered.

It may be determined that there is a period between the determined time of use and a further time of use which is less than a predetermined period; and wherein the time switch is set in order to prepare the motor vehicle for the earlier time of use and to maintain the preparation until the later time of use. Alternatively, the respective earlier and/or later times of use can be discarded.

The time of use can be determined on the basis of pattern recognition in available information, wherein the detected pattern is output together with the proposal. This allows the user to see the pattern on which the proposal was determined in an improved way. The user can confirm or reject the time of use regardless of the pattern. In the future, a pattern that is erroneous from the user's point of view can be used to determine the time of use to a reduced extent in the future.

The time of use may be determined on the basis of information from a predetermined source; and wherein the source is output together with the proposal. By specifying the source, the user can decide whether or not to confirm a proposed time of use. Optionally, he can reduce or increase the use of the source. The source may relate in particular to a public service providing, for example, weather information. A non-public source can also be determined. For example, information relating to another specific user may form its own source.

A proposal for a time of use can only be output if the time switch is not set to prepare the vehicle for that time of use. In other words, a time of use for which a time switch is already set cannot be output. In a further embodiment, a specific time of use can only be output when at least one time switch is still unset or deactivated. Deleting a time of use loaded in a time switch can thus be avoided.

User satisfaction with a proposed time of use can be detected to improve the determination of a time of use. In the case of machine learning, supervised learning can be carried out. Satisfaction may relate to the time of use or to an aspect which has been used to determine the time of use, for example a detected pattern or a source of information.

According to a further aspect of this disclosure, a control device for controlling a preparation function for an operation of a motor vehicle, which comprises a time switch for controlling the preparation function, comprises the following: an interface for connecting to the time switch; an interaction device; and a processing device. The processing device is set up to determine an estimated time of use of the motor vehicle on the basis of a previous journey of the motor vehicle; to output the specified time of use and to detect a confirmation of the time of use; and to set the time switch to prepare the motor vehicle at the confirmed time of use.

The processing device may be set up to perform all or part of a method described herein. For this purpose, the processing device may comprise a programmable microcomputer or microcontroller and the method may be present in the form of a computer program product with program code means. The computer program product may also be stored on a computer-readable disk. Features or advantages of the method may be transferred to the device or vice versa.

According to a further aspect, a motor vehicle comprises a control device described herein.

Other objects, advantages and novel features of the embodiments of the present disclosure will become apparent from the following detailed description of one or more preferred embodiments when considered in conjunction with the accompanying drawings.

DETAILED DESCRIPTION OF THE DRAWINGS

Figure 1:
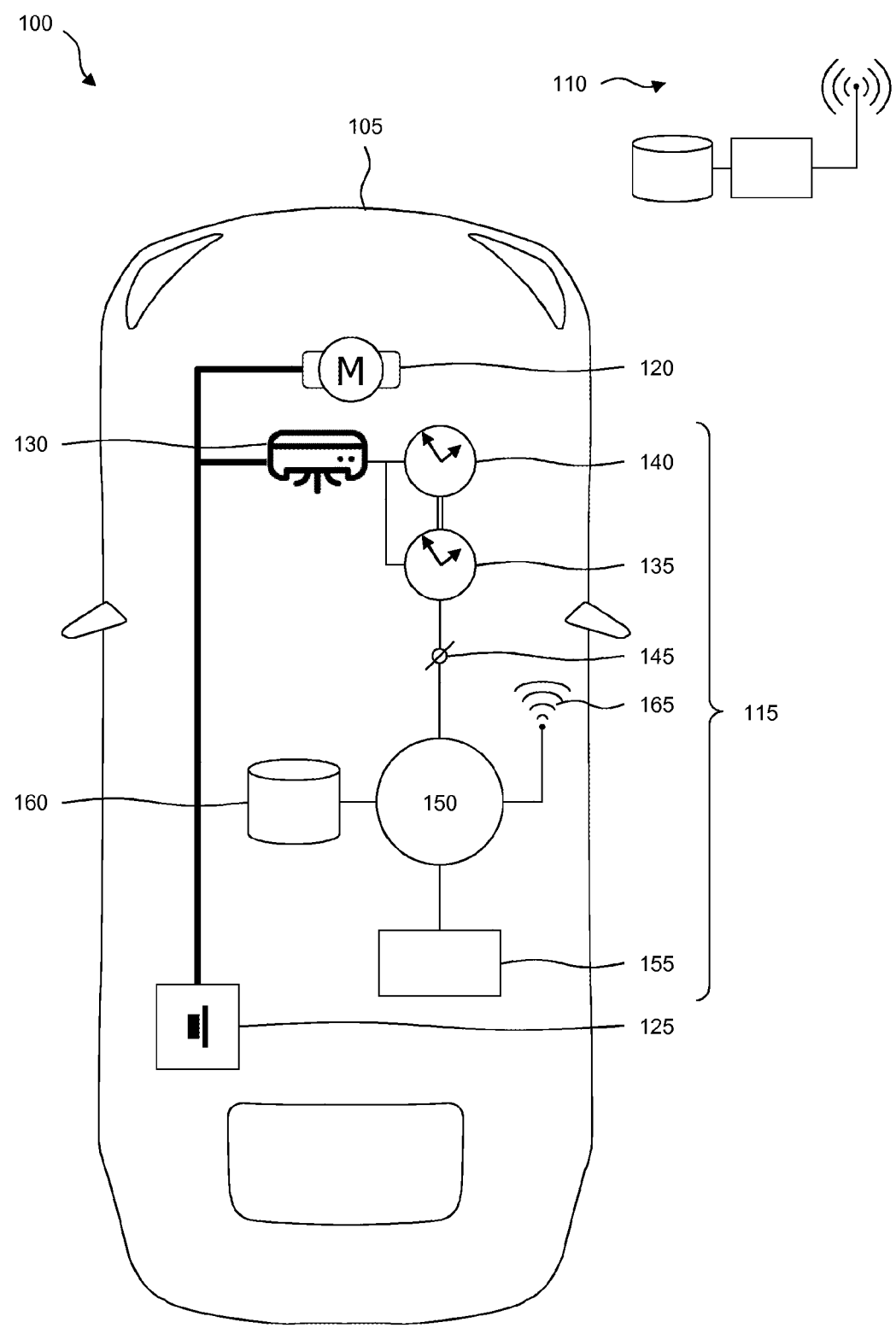
FIG. 1 illustrates a system.

FIG. 1 shows a system 100 comprising a motor vehicle 105 and an external site 110. On board the motor vehicle 105, a control device 115 is provided which is set up to determine an imminent time of use of the motor vehicle and, preferably depending on that, to control a preparation function of the motor vehicle 105 in its operation or its use.

The motor vehicle 105 can be driven by means of a traction drive 120. The traction drive 120 may comprise an internal combustion engine or an electric drive motor. In addition, an electrical energy store 125 is preferably provided, which can be used for the operation of the electric traction drive 120 or another unit.

A device 130 is provided for the preparation of an operation of the motor vehicle 105. Particularly preferably, the device 130 is provided as heating, cooling or ventilation of an interior, a drive component 120 or the energy store 125 of the motor vehicle 105. Purely by way of example, the device 130 is symbolically represented as air conditioning. It is particularly preferred that the device 130 can be operated using electrical energy from the energy store 125.

The device 130 can be controlled manually or time-based. For this purpose, a first time switch 135 and a second time switch 140 are preferably provided, each of which can be loaded with a time of use of the motor vehicle 105. Once the loaded time of use has been reached, a preparation function can be controlled by means of the device 130. Further preferably, the time switches 135 and 140 are connected to each other in such a way that the second time switch 140 cannot trigger the preparation function if the first time switch 135 is loaded with a time of use. The second time switch 140 can thus be effectively inhibited or overridden by the first time switch 135.

The second time switch 140 is preferably a periodic time switch 140 and may support recurring times of use, for example, to control the preparation of the 105 motor vehicle at the same time on predetermined days of a week. Several second time switches 140 may also be provided, wherein interdependencies or an expected duration of preparation can be taken into account. Thus for example, it is possible to prevent the preparation of the motor vehicle 105 from being controlled while preparation is already taking place. The first time switch 135, on the other hand, is preferably a one-time time switch, which, after reaching the time loaded into it, triggers the preparation function only once and then deactivates itself, so that it is no longer considered set, or deletes the time loaded into it.

The control device 115 is preferably connected by means of an interface 145 to the first time switch 135 and/or the second time switch 140 and can access it to read and/or write. In particular, an impending time at which the preparation function is to be controlled can be read and/or written. In the case of the second time switch 140, a period of time between recurring times can also be read and/or written. Further information may be associated with such a set time and the information may also be read and/or written.

It is preferred that individual times within a predetermined observation period may be suspended. In particular, the period under consideration may be one week and the period of time may be one day. For example, the second time switch 140 can be set to trigger at the same time every day within a week, wherein days on which triggering occurs can be selected individually.

A processing device 150 is connected to the interface 145, as well as preferably connected to an interaction device 155, a memory device 160 and/or a communication device 165. The optional interaction device 155 is set up to allow output to a user and/or input from the user. The interaction device 155 may be part of another system on board the motor vehicle 105 and in particular may have a touchscreen. The optional memory device 160 is set up to store one or more times of use. Optionally, other, or additional information may be stored in the memory device 160. Corresponding information can also be obtained from the external site 110 by means of the communication device 165. The communication device 165 may in particular use a mobile network and/or the Internet to operate a communication connection to the external site 110.

Figure 2:
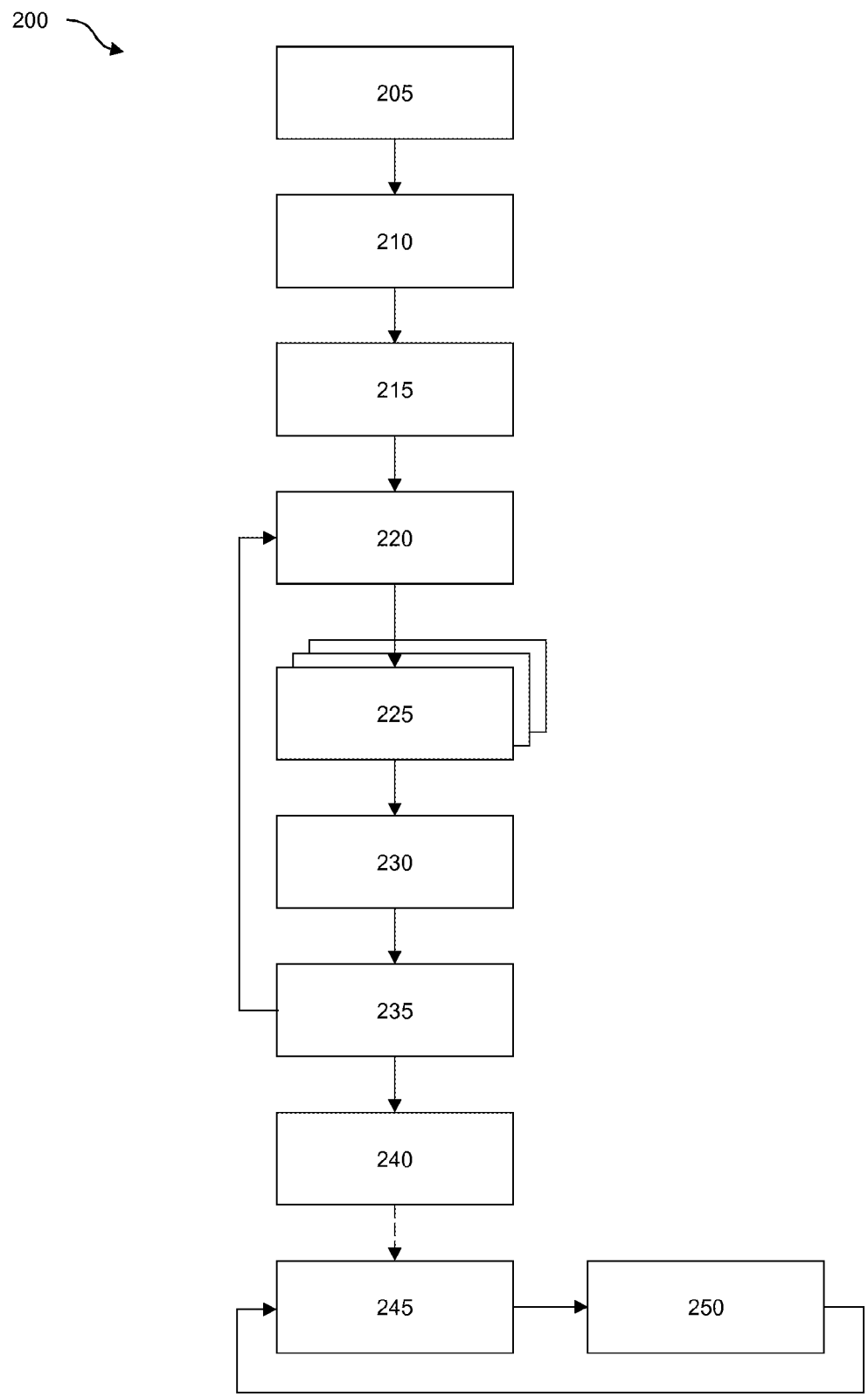
FIG. 2 illustrates a flow diagram of a method.

FIG. 2 shows a flow diagram of an exemplary method 200, which in particular can be implemented using the control device 115. The specified sequence of the steps shown can be varied in further embodiments, as a person skilled in the art easily recognizes. Not all embodiments described herein are reproduced in the present flow diagram.

In a step 205, a driving state of the motor vehicle 105 can be determined. This preferably means that at least one user is on board the motor vehicle 105 and further preferably that the motor vehicle 105 is in a driving-readiness state or a driving state. Optionally, an occupancy state can also be determined. In a step 210, an imminent transfer of the motor vehicle 105 to a parked state can be determined. The transfer may, for example, be carried out on the occasion of an initiated search for a parking space, on the basis of a navigation destination or a calendar entry which is assigned to the motor vehicle 105 or one of its passengers. Preferably, the transfer is determined by machine learning by procuring information from one or more sources and correlating it with past parking processes. If a pattern can be detected, the upcoming parking process can be determined on the basis of the pattern.

In a step 215, boundary conditions can be detected that may have an impact on a time of use that follows the parking process. The boundary conditions may also have been determined in the context of determining the imminent transfer of the motor vehicle 105 to the parked state. Examples of boundary conditions include weather information, a timetable of a train or a ferry running near an expected parking location, or a day or week day. It is also possible to identify information that may have a direct impact on a time of use, such as a calendar entry for the motor vehicle 105 or a user on board, or a manual entry of the user.

In a step 220, a pattern can be determined in information based on past uses that was available before the uses. In other words, it is possible to determine which information or combinations can be used as indicators of imminent use of the motor vehicle 105. In a step 225, one or more upcoming times of use of the motor vehicle 105 can be determined on the basis of one of these patterns, a statistical analysis of historical information or another heuristic. For each time of use, a probability can also be determined with which the use of the vehicle 105 is expected at the specified time of use.

In a step 235, the number of determined times of use can be reduced. In particular, a time of use that fits well with a predetermined time of use, a boundary condition, or a user preference can be retained or preferred, while a determined time of use that fits less well to existing information can be discarded. A determined time of use which is no longer of interest due to a current situation on board the motor vehicle can be discarded.

The determined times of use can be sorted according to one or more criteria, so that the time of use, the accuracy of determination of which is best, the probability of which is highest or the compatibility of which with other information is greatest, can be identified. Times of use may be organized in the form of a list that can be sorted according to one or more criteria.

In a step 235, one, some or all of the determined times of use can be output to a user. The number of times of use which are output may depend on an available space in one of the time switches 135, 140. For example, only as many times of use can be output as memory slots 135, 140 can be loaded with times. In another variant, no more of the output times of use can be confirmed by the user than the number of memory slots 135, 140 that can be loaded with times.

The user can reject, change, or accept a determined time of use. If multiple times of use are output, additional information can be output explaining how the determination came about or how high the quality of the particular time of use is considered to be. For example, the determined probability, the determined compatibility with a predetermined time of use or a source of information, on the basis of which the determination was made, can be output. If a statistical analysis has been carried out, a statistical parameter such as a hypothesis or a standard deviation can be output. If a pattern has been determined, the pattern or a reference to the pattern may be output.

The purpose of the additional information is to facilitate the user's selection and confirmation of one or more of the output times of use. On the other hand, the user can intervene in the determination procedure by which times of use are determined. For example, the user can indicate how satisfied they are with a determined time of use. He can also report which pattern he has been given he considers to be realistic, which source of information he considers to be relevant or which logical conclusion he considers to be appropriate. Conversely, the user can of course also express displeasure with a piece of information. The feedback can be used for a subsequent determination in step 220. Information, sources, or filters rated positive by the user can be reinforced or others can be attenuated. The assessment of the user may be independent of his confirmation of a proposed time of use. For example, the user may confirm a time of use which, in his opinion, was determined on the basis of generally inaccurate conclusions.

If at least one time of use has been confirmed, it can be loaded into one of the time switches 135, 140 in a step 240. Optionally, a time loaded into one of the time switches 135, 140 can be adjusted or altered to include the confirmed time of use. For example, if the confirmed time of use is a time of Tuesday, 9:00 a.m. and a time switch 135, 140 is set to Monday, 9:00, both times can be integrated with each other in the form of a recurring time of use and loaded into a second time switch 140. If, on the other hand, a time of use of Tuesday, 8:30 a.m. is already loaded into one of the time switches 135, 140, the earlier time of use can be adopted, the later time of use can be adopted or a time of use between the two can be determined and adopted. Optionally, a period during which the preparation function is to be maintained can also be determined in such a way that the motor vehicle 105 is prepared at both times. In the present example, in particular, the preparation function can be started before 8:30, so that the motor vehicle 105 is just ready by 8:30. The preparation function can then be maintained until approx. 9:00 or a little longer, so that the motor vehicle 105 can be maintained as prepared as continuously as possible until 9:00. The maintenance time can also be chosen to be a little shorter. If the preparation function involves adjusting the temperature of a component of the motor vehicle 105, it can be trusted that at least part of the temperature adjustment effect will be maintained for a certain period of time even without active intervention. For example, in the example given, the preparation function could remain activated until 8:50. The preparation function can then be switched off and the temperature-adjusted component can adjust its temperature to that of the environment. A temperature difference between the component and the environment can be taken into account when determining the end time of the preparation function.

In a step 245 it can be determined that a time loaded into one of the time switches 135, 140 has been reached. If the time switch 135, 140 is activated, the preparation function can be controlled in a step 250. The minimum duration of the preparation function can be specified or determined on the basis of applicable environmental conditions. The maximum duration can be predetermined, as described in more detail above.

REFERENCE CHARACTER LIST

100 System
105 motor vehicle
110 external site
115 control device
120 traction drive
125 electric energy store
130 device
135 first time switch
140 second time switch
145 interface
150 processing device
155 interaction device
160 memory device
165 communication device
200 method
205 determining driving state
210 determining transfer of parked state
215 determining boundary conditions
220 determining patterns
225 determining time of use
230 reducing the number of times of use
235 detect output/confirmation
240 loading time switch
245 time occurred
250 controlling the preparation function

What is claimed is:

1. A method for controlling a preparation function for an operation of a motor vehicle, the method comprising:
   determining an expected time of use of the motor vehicle based on a previous journey of the motor vehicle, wherein the motor vehicle includes a time switch configured to control the preparation function;
   outputting the specified time of use and detecting a confirmation of the time of use; and
   setting the time switch to prepare the motor vehicle at the confirmed time of use.

2. The method according to claim 1, wherein the time of use is determined based on context-based data.

3. The method according to claim 2, wherein the confirmed time of use is evaluated by machine learning in order to improve a future determination of a time of use.

4. The method according to claim 3, wherein multiple proposals for expected times of use are determined, of which only a predetermined number N is output.

5. The method according to claim 4, wherein a probability with which the proposal will be adopted is determined for each proposal, and only proposals with assigned probabilities exceeding a predetermined threshold are output.

6. The method according to claim 5, wherein a probability with which the proposal will be adopted is determined for each of the proposals, and only the N proposals with the highest determined probabilities are output.

7. The method according to claim 6, wherein the time of use is determined after an imminent transfer of the motor vehicle from a driving state to a parked state has been determined.

8. The method according to claim 7, wherein the output is carried out only after it has been determined that the motor vehicle is in a state other than a parked state.

9. The method according to claim 8, wherein a proposal is determined based on a time loaded into the time switch.

10. The method according to claim 9, wherein it is determined that there is a period between the time of use and a further time of use which is less than a predetermined duration; and wherein the time switch is set to prepare the motor vehicle at the earlier time of use and to maintain preparation until the later time of use.

11. The method according to claim 10, wherein the time of use is determined based on a pattern recognition in available information and the detected pattern is output together with the proposal.

12. The method according to claim 11, wherein the time of use is determined based on information originating from a predetermined source; and wherein the source is output together with the proposal.

13. The method according to claim 12, wherein a proposal for a time of use is only output if the time switch is not set to prepare the motor vehicle for that time of use.

14. The method according to claim 13, wherein the satisfaction of the user with a proposed time of use is detected in order to improve the determination of a time of use.

15. A control device configured to control a preparation function for an operation of a motor vehicle comprising a time switch configured to control the preparation function, wherein the control device comprises:
   an interface configured to connect to the time switch;
   an interaction device; and
   a processing device which is configured to:
   determine an expected time of use of the motor vehicle on the basis of a previous journey of the motor vehicle;
   output the determined time of use and capture a confirmation of the time of use; and
   set the time switch in order to prepare the motor vehicle at the confirmed time of use.

* * * * *